United States Patent [19]
Mandler

[11] 3,731,607
[45] May 8, 1973

[54] STEREOSCOPIC CAMERA ARRANGEMENT

[76] Inventor: Klaus Rudolf Mandler, Nestorstrasse 11, Berlin, Germany

[22] Filed: Aug. 6, 1971

[21] Appl. No.: 169,688

[30] Foreign Application Priority Data

Aug. 11, 1970   Germany...................P 20 40 952.3

[52] U.S. Cl. .....................................95/18 P, 95/86
[51] Int. Cl...............................................G03b 35/02
[58] Field of Search ................................95/18 P, 86

[56] References Cited

UNITED STATES PATENTS 3,491,669   1/1970   McBride...................................95/18

*Primary Examiner*—John M. Horan
*Attorney*—Arthur O. Klein

[57] ABSTRACT

An arrangement for taking stereographic photographs with a movably mounted single lens camera. The camera is pivotally mounted by means of a hollow cylindrical member on a carriage which is laterally movable on a pair of parallel rails with respect to the object to be photographed. The pivot axis of the camera is located in the plane of the lenticular screen, respectively film of the camera. A pair of guide means are slidably mounted in the carriage of the camera and are normally movably mounted with respect to each other on said carriage by being connected to an endless cable which is mounted around at least three rotatable support rollers extending from said carriage. The pair of guide means are connected by means of pin and slot connections to the base of the camera. A guide member having a guide slot which is substantially coextensive with the lateral movement of the camera, is adjustably mounted underneath the carriage and a pin of a first one of said pin and slot connections is slidably movable in the guide slot thereof. A pin of the second one of said pin and slot connections extends into a slot in the base of the camera. A guide rail, being also substantially coextensive with the lateral movement of the camera is mounted underneath the carriage. A vertically movable shaft is coaxially movably mounted in the hollow cylindrical member and its movement is controlled by the guide rail for coaction with a pivotable lever mounted in the camera which actuates the screen moving mechanism and shutter mechanism of the camera.

8 Claims, 4 Drawing Figures

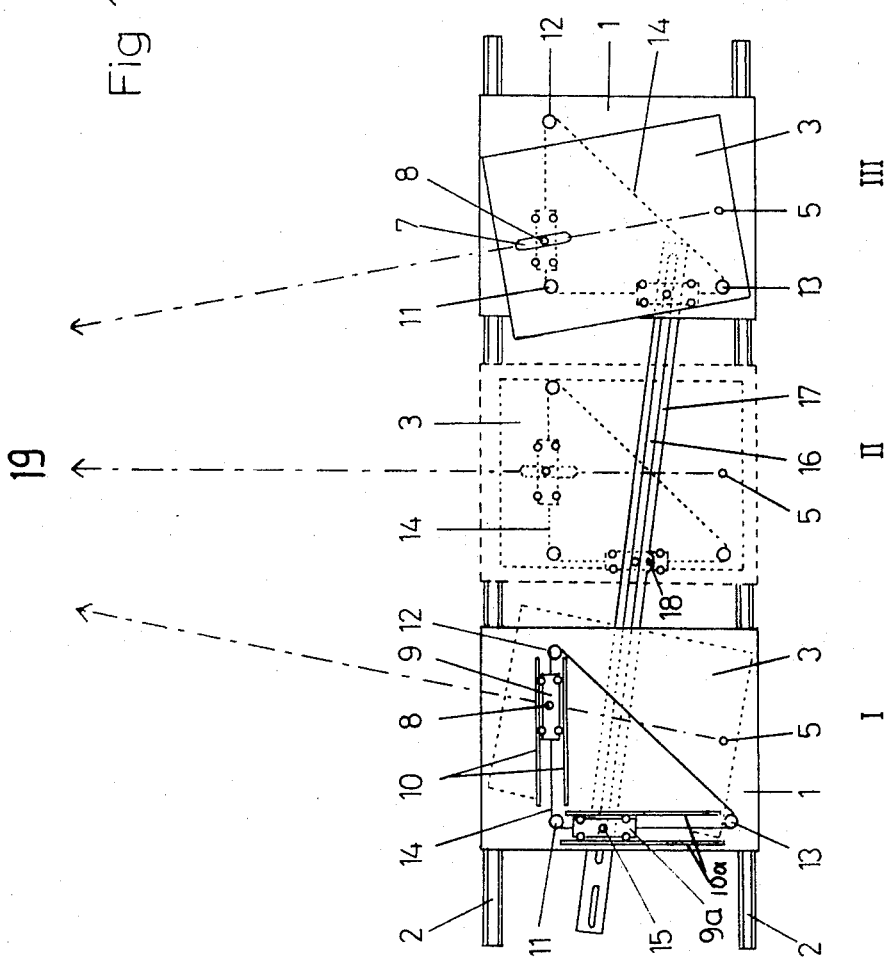

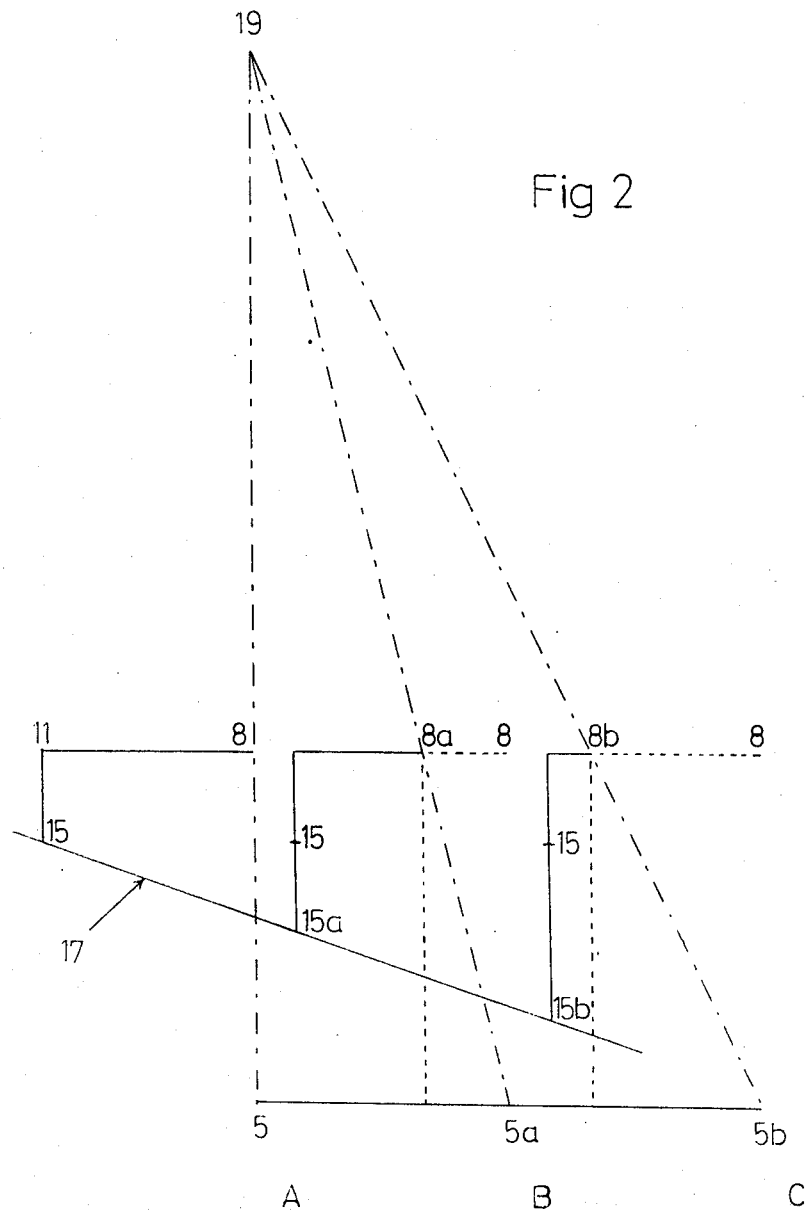

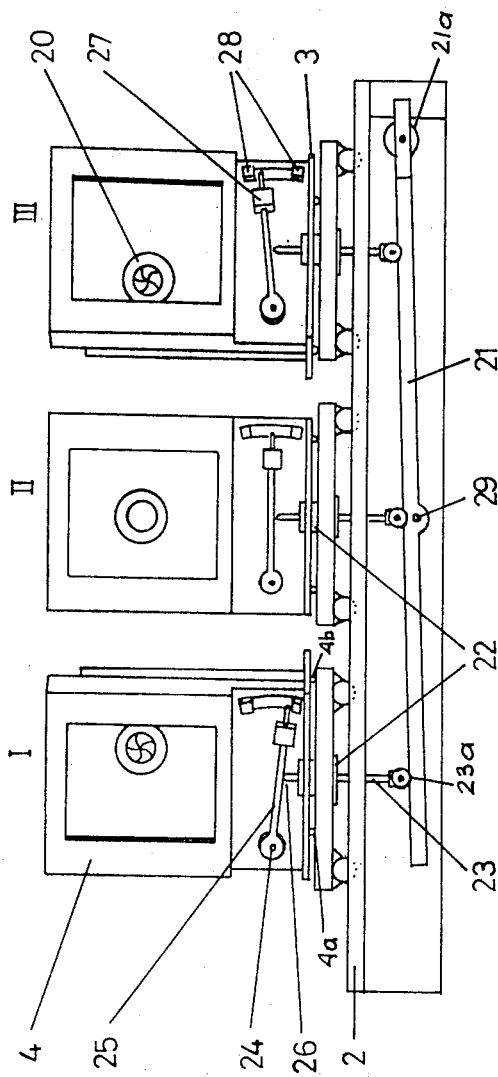
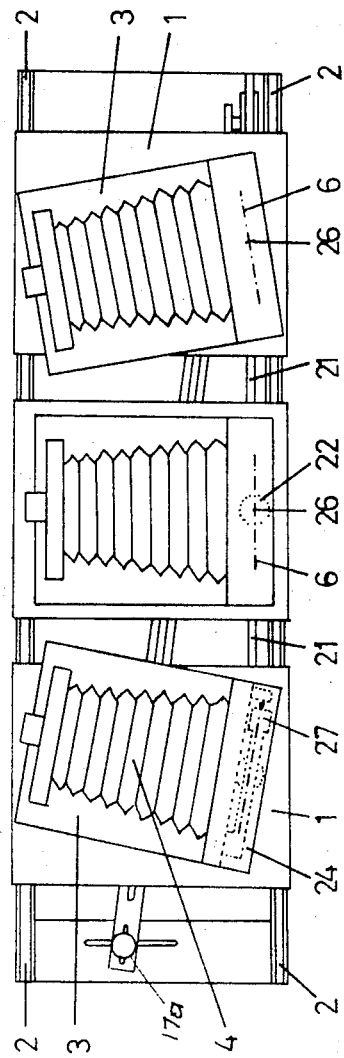

STEREOSCOPIC CAMERA ARRANGEMENT

The invention relates to a camera for producing parallax stereographs, also referred to as stereographic photographs. The stereoscopic camera arrangement of this invention differs from arrangements of the prior art in that the various functions, which must be carried out by a stereoscopic camera, are independently adjustable but are nevertheless connected by mechanical means so that, once the camera arrangement has been adjusted, the various functions of the camera and its operational cycle can be reproduced until the camera arrangement is again readjusted.

There are already known a number of systems for producing stereoscopic photographs with the aid of scanning lenses, for example, the production of "3-D pictures," "parallax panoramagrams," and the like.

In all of those known processes it is necessary to take photographs of the object to be photographed from at least two different points along a base according to the rules of stereoscopy. Generally a large number of parallactically different partial pictures are required. These partial pictures can be obtained by means of three known, but fundamentally different processes.

There is for example a known method for taking photographs by means of a multi-objective lens camera. With this kind of a camera there is arranged a row of objective lenses along a horizontal base line, by means of which a corresponding number of photographs are taken in juxtaposed relationship to each other on a film in the camera. This known type of a camera has the drawback in that it is difficult, purely for mechanical reasons, to have all objective lenses pointed exactly towards the center of the object which is to be photographed. Furthermore, because of the limited space available, the number of partial pictures that can be taken is limited and accordingly also the base line cannot be changed.

It is also known to use a camera having an objective lens of very large diameter for taking stereographic photographs. It is necessary with such a camera to provide auxiliary means such as laterally movable slit shutters and screens. The base line in such a camera is also quite limited because the objective lens is of a size that is difficult to manufacture and furthermore has an inordinately large weight because of its size.

Lastly, it is known to produce stereographic photographs with a camera having a single objective lens, the camera being laterally movable along a base line, and the partial photographs are successively taken as the camera moves along this base line. This camera and process for taking stereographic photographs has the drawback that instantaneous pictures cannot be taken. Nevertheless, it is the last-mentioned method which is used practically with all three D-photographic methods because in such an arrangement the number of partial photographs and the length of the base line are not limited. This type of a camera can be adjusted, that is, the optical axis of the camera can be adjusted in two fundamentally different ways.

Thus, the camera may be adjusted by mechanically linking the object to be photographed and the camera itself. This linkage can take the form of a lever arm which is pivotable about the middle point of the object to be photographed and which is connected to the camera, the latter being movable on curved rails having the center of curvature at the middle point of the object to be photographed. It is of course self-evident that such an arrangement, because of purely mechanical reasons, can only be used for taking photographs of an object which is spaced a short distance from the objective lens of the camera. Furthermore, such an arrangement is very difficult to be moved from one location to another.

The other alternative resides in providing an arrangement wherein the stereographic camera or its optical axis are adjusted by means of adjusting gear trains, adjusting cams, or levers actuated by adjusting cams so that the optical axis is always pointing towards the middle point of the object to be photographed while the camera moves laterally along a base line. The adjusting of the camera so that its axis points towards the middle point of the object to be photographed at different distances can be attained by adjusting cam surfaces or cams.

SUMMARY OF THE INVENTION

The aforedescribed known arrangements for taking stereographic photographs have important drawbacks as described hereinabove. It is a general object of this invention to provide a stereoscopic camera arrangement in which the above-described drawbacks are reduced or completely eliminated.

Before discussing in detail the arrangement of this invention, it is first of all necessary to describe the operations of the various components of a stereoscopic camera when taking a series of stereographic photographs. It should be noted that the various operations of the components can be independently adjusted, the means for adjusting being operatively connected to each other so that the positions taken by the camera can be reproduced a preselected number of times.

Thus, first of all, the stereoscopic camera must have its optical axis pointed towards the central point of the object to be photographed. Simultaneously therewith, the following movement must take place: First of all, a lateral movement of the camera along a predetermined distance must take place, the extent of lateral movement having a predetermined relationship to the distance and extent of depth of field of the object to be photographed. Secondly, there must occur simultaneously a displacement of the screen in the camera, relative to the film thereof, said shifting corresponding exactly to one lens width. Lastly, it is necessary that the opening and closing of the camera shutter takes place exactly at the beginning and at the end of the aforementioned operations.

The known arrangements have the drawback that the aforedescribed operations cannot be adjusted independently from each other and in an infinitely variable manner. Consequently, the stereoscopic camera arrangements of the prior art do not operate sufficiently securely and rapidly. Thus mutual reaction of the adjustment of the stereoscopic camera with respect to the distance of the object to be photographed and the movement of the camera along the base line requires with the new adjustment of one function a further adjustment of the other function or one or the other functions are not infinitely variably adjustable. Thus, for example, in one known arrangement it is necessary to exchange gear wheels in order to adjust the distance or base line of the camera. It is also disadvantageous, when the stereoscopic camera is to be adjusted to intermediate values, to require a moving of the entire camera arrangement, which in turn requires the readjustment of other functions of the camera. An additional drawback resides that in all of the known stereoscopic camera arrangements the shutter disc cannot be exchanged or the diaphragm adjusted without causing a reaction affecting the other functions of the stereoscopic camera arrangement.

It is thus another object of the invention to provide a stereoscopic camera arrangement wherein the various operations of the camera can be independently adjusted from each other and wherein the various movements of the components of the camera are carried out practically completely mechanically.

The stereoscopic camera arrangement of this invention comprises a carriage which is laterally movable along a pair of parallel rails, and on which the camera proper is pivotally supported. The axis of the pivotal support of the camera lies in the lenticular screen, which is also the plane in which the film of the camera lies. The carriage supports a pair of guide means which are connected to an endless cable, the guide means being normally movable relative to each other and the cable being supported on at least three rotatable guide rollers mounted on the carriage. The cable is endless and taughtly mounted around the three guide rollers. The arrangement of the invention further comprises a first guide member having a guide slot which is substantially coextensive with the lateral movement of the carriage. A rod extending from a first one of the pair of guide means is slidable in the guide slot and a rod extending from the second one of the guide means is pivotally mounted in the base of the camera so as to extend through the optical axis of the camera, that is, the imaginary line running from the pivot point at the screen of the camera and the central point in the object to be photographed. By placing the rod of the second guide means as described hereinabove, the longest possible torque moment for acting on the camera is available. The first guide means which moves normal to the second guide means has a rod which engages in the guide slot of the first guide member, so that with a lateral movement of the camera carriage the position of the base of the camera is controlled by means of the endless cable and rod attached thereto. All of the aforedescribed adjusting elements are mounted underneath the camera base. The drive for moving the screen in the camera is actuated by means of a shaft extending through a hollow cylindrical support mounted in the camera carriage and the base of the camera about which the latter may pivot. This shaft is vertically movable and has a scanning roller at its lower end which moves along a second guide member also mounted underneath the carriage of the camera. This shaft bears with its upper end against a lever pivotally mounted in the camera. The lever is operatively connected to a screen-moving mechanism, on the one hand, and to a shutter-actuating mechanism, on the other hand. With the aforedescribed arrangement the adjustment as to distance of the object to be photographed and the base line along which the stereographic photographs are to be obtained can be independently adjusted without mutual reaction, said adjustments however being reproduceable while an identical screen movement is obtained, preferably a movement corresponding to one lens width. In order to use screens of different lens widths, respectively, dividing the screen widths, it is possible to adjust the distance of the limit stops which coact with the pivotal lever and/or adjust the length of the lever.

BRIEF DESCRIPTION OF THE DRAWING

The nature of the invention and its advantages will appear more fully from the following detailed description taken in conjunction with the appended drawing, in which:

FIG. 1 is a simplified schematic plan view of the camera carriage being mounted on a pair of rails, the carriage being shown in three different positions, wherein all those details which are not required for an understanding of the arrangement of the invention have been omitted;

FIG. 2 is a graphic representation of the function of the adjusting mechanism of the camera in three different positions;

FIG. 3 is a schematic elevational view of the camera as viewed from the back end of the camera showing the camera in three different positions; and FIG. 4 is a schematic plan view of the camera as shown in the three different positions of FIG. 3.

DETAILED DESCRIPTION

Referring now to the drawing, there is shown in FIG. 1 a camera carriage 1 which is laterally movable with respect to an object 19 to be photographed along a pair of rails 2. A base plate 3 of the camera 4 is pivotable on the pivot support 5. It is essential that this pivot support 5 is so situated that its axis extends through the plane of the lenticular camera screen, in which plane the film of the camera is also located. The base plate 3 is provided at its underside with a longitudinal slit 7 into which there extends a rod 8. This rod 8 is connected and moves jointly with the guiding element 9, the latter being movable on rails 10 mounted on the carriage 1. The guide element 9 is secured to the endless cable 14 and moves between the guide rollers 11 and 12 which are rotatably mounted on the carriage 1, the cable 14 also being wound around a third guide roller 13 which is also rotatably mounted on the carriage 1.

A second guide element 9a is also slidable on a pair of guide rails 10a which are also mounted on the carriage 1, the second guide element 9a being movable between the guide rollers 11 and 13 and also being connected to the endless cable 14. A second guide element 9a has a rod 15 which engages in a guide slot 16 of a guide member 17 which is pivotally mounted underneath the carriage 1 and between the rails 2 about a pivot 18, which is shown in FIG. 1 adjacent to the center line of the guide member 17 for sake of clarity. When the camera 4 is moved laterally from position I to position II, the rod 15 is forced to move jointly with the guide member 9a along the pair of rails 10a towards the guide roller 13 thereby forcing the rod 8 via the endless cable 14 to move in the direction of the guide roller 11. The axis of the camera and also the optical axis is thus adjusted to coincide exactly with a line extending from the pivot point 5 towards the center of the object 19 to be photographed. The more oblique the position of the guide member 17 is with respect to the guide rails 2, the closer the object to be photographed can be positioned. The position of the guide member 17 can be adjusted by means of a pin and slot connection 17a (see FIG. 4). When the guide member 17 is parallel to the guide rails 2, then the camera 4 does not move angularly relative to the carriage 1 because the camera is then theoretically adjusted for taking stereographic photographs of an object located at infinity.

Reference is made to the graphic illustration in FIG. 2 which illustrates the geometric correctness of the principle described hereinabove. Only the most important points of FIG. 1 are schematically illustrated. In particular, the middle position and two positions removed laterally towards the right are shown, whereby one right position is laterally removed twice the distance than the other right position.

The reference numeral 5 indicates the pivot point of the camera 4 in the plane of the screen, while 19 indicates the center of the object to be photographed so that the dot-dash line 5-8-19 represents the optical axis which can also be noted from FIG. 1. The reference numerals 8 and 15 indicate the points where the centers of the rods 8 and 15 of FIG. 1 are located, these rods being connected to each other by means of the taught endless cable 14 which moves over the guide roller 11 also shown in FIG. 2.

The oblique line 15-15a-15b represents in FIG. 2 the aforementioned guide member 17, into the guide slot 16 of which there extends the rod 15 which is thus forced to move along the guide slot 16 as the lateral movement of the camera 4 occurs. It can be noted that the distance 5-8 amounts to $1/x$, which is equal to one-third in FIG. 2, of the distance 5-19. It is necessary in order for the optical axis of the camera 4 to always coincide with the point 19 that the point 8 (respectively 8a, 8b) is always situated $1/x$, in the example one-third, of the distance from the pivot point 5 (respectively 5a, 5b) and the center point 19, as the camera 4 moves laterally, which is shown by the dotted lines in FIG. 2. Thus when the camera 4 moves from position A to position B so that the pivot point 5 reaches the position 5a, the rod 8 must reach the position 8a. This is carried out due to the oblique position assumed by the guide member 17, which causes the rod 15 to move into the position 15a. This distance 15-15a corresponds to the distance 8-8a and is equal to one-third of the distance 5-5a.

When the camera 4 has assumed the position C, the rod 8 does again lag behind an equal distance, that is a total again of one-third of the distance 5-5b, which is shown by the dotted line in FIG. 2. In this manner the optical axis of the camera is again directed from 5b via 8b towards the central point 19. This adjustment is, as is clearly shown in FIG. 2, mathematically exact and functions until the extreme outer positions of the base line are reached, which is not possible to be carried out with the arrangements of the prior art.

The arrangement according to the invention makes it possible to mount all adjusting components underneath the camera carriage 4 in a very space-saving manner which is, in practice, an important advantage, in particular with large cameras having a long focal length. It is also an important advantage that the torque moment which is instrumental in pivoting the camera 4 about the pivot point 5 has as long a torque arm as possible which is mounted underneath the optical axis and corresponds practically in length to the focal length and of the entire carriage 1, and thus provides a flawless guidance of the camera.

The camera 4 is securely supported on three points which are a hollow cylindrical shaft 22 which is concentric with respect to the pivot point 5, and two rollers 4a and 4b mounted underneath the left front and right front corners of the base plate 3 and being radially spaced from the pivot point 5. The rollers 4a and 4b have not been illustrated in detail for sake of clarity.

The additional operations for taking the stereographic photographs according to the steps described hereinabove can be independently adjusted from each other. The adjusting means for the various other operations are, however, connected to the aforedescribed adjusting means so that the entire operational cycle of the stereoscopic camera can be reproduced. Thus the moving of the screen 6 and of the shutter 20 are controlled by the coaction of a guide rail 29 and a scanning roller 23a which is rotatably mounted at the lower end of a shaft 23 which extends through the hollow cylindrical support 22 mounted in the carriage 4 and base plate 3 of the camera and forming the pivot support 5 (see FIGS. 1 and 3). The guide rail 3 extends underneath the camera carriage 4 and is substantially coextensive with the lateral movement of the camera 4.

Since the camera 4, as described hereinabove, must execute a lateral as well as an angular movement about the pivot point 5, the adjusting mechanism for the screen 6 is constructed so that the pivot point 5 of the camera 4 is embodied as a hollow cylindrical body 22 through which the guide rail 21 can be scanned by means of a vertically movable shaft 23 extending through the hollow body 22. The shaft 23 has a rounded, preferably spherical surface 26 at its upper end which coacts with a lever 25 pivotally mounted about a pivot point 24. The contact between the lever 25 and the spherical surface of the upper end of the shaft 23 makes possible that an angular movement of one member relative to the other one can occur while the two members still remain in contact so that the lever 25 can be pivoted about the pivot point 24 while it carries out an angular movement relative to the shaft 23. The pivotal movement of the lever 25 about the pivot point 24 is instrumental in causing a shifting of the screen-moving mechanism of the camera, which is well-known and is not therefore illustrated in detail. As can be noted from FIG. 3, the guide rail 21 presents an oblique guide surface on which the scanning roller 23a of the shaft 23 moves, thereby causing the shaft 23 to move in a vertical direction and cause a pivoting of the lever 25 about the pivot point 24. Adjacent to the free end of the lever 25 there is mounted a switch 27, preferably a microswitch element, the contact feeler of which is adapted to contact one of two contact elements 28 disposed along an arc and mounted in the camera at radial distances from the pivot point 24. The contact elements 28 are adjusted so that during the moving of the screen 6 along exactly one lens width, the electrically operated shutter 20 of the objective lens of the camera is opened but is closed when the feeler of the switch 27 is in contact with one of the contact elements 28. The contact switch 27, preferably a microswitch, is also instrumental in controlling the non-illustrated drive motor for the carriage 4 which moves the latter laterally thereby bringing about the lateral movement of the camera 4. The switch 27 brings about a stopping of the drive motor at the two lateral limit positions for the camera 4.

Thus it can be noted that by a simple adjustment of the position of the contact elements 28, it is also possible to produce different screens, that is, a different division, in the camera 4 without constructionally changing the camera arrangement.

The spherical surface 26 on the upper end of the shaft 23 which contacts the lever 25 produces an exact switching operation of the switch 27 even when the camera is operating with a screen of a very fine division, that is, only a relatively small shifting of the screen is required.

It can be noted from FIG. 3 that the guide rail 21 is pivotally supported about a pivot point 29 so that the position of the guide rail 21 can be adjusted by a well-known adjusting mechanism 21a. The more inclined the position of the guide rail 21 is, the more intensely it influences the adjusting operation of the lever 25. It will be understood that if the guide rail 21 is more inclined than is shown in FIG. 3, then even with a short run of the camera 4, that is, a short base line, the required shifting of the screen of one lens width is attained and the switch 27 causes the shutter 20 to close and to shut off the drive motor for the carriage 1. The pivot point 29 is shown in FIG. 3, for sake of clarity, as being situated below its true position, which is along the upper edge of the guide rail 21. Thus by adjusting the inclination of the guide rail 21 it is possible to adjust the camera for a preselected base line, the maximum base line corresponding to the length of the guide rail 21. A correct adjustment of the inclination of the guide rail 21 will always bring about a correct and complete automatic shifting of the screen a distance corresponding to one lens width.

In the aforedescribed control mechanism for the adjustment of the operations of a stereoscopic camera, so that the optical axis thereof is directed towards a central point of an object to be photographed, can be carried out according to the aforedescribed operational conditions and function independently from each other but nevertheless are reproduceable and operationally connected to each other.

The principle advantage of the stereoscopic camera arrangement of this invention resides in its simplicity and flaw-free operation. A further advantages resides in the fact that the arrangement, when compared to equivalent arrangements of the prior art, is very light which makes it possible to transport more easily the stereoscopic camera arrangement of this invention. A further advantage resides in the simplicity of operation of the arrangement. For example, the different operations of the camera can all be carried out by practically actuating a simple push-button which causes the entire arrangement to be actuated.

The invention is not limited to the single embodiment illustrated in the drawing. The individual components can, without difficulty, be exchanged for other equivalent components that may carry out the same function. For example, the rails for supporting the carriage 1 can have any type of preselected profile.

Furthermore, the type and operation of the shutter for the objective lens can be varied. The various pivot points can be embodied as simple pivotable connections but may also have roller bearings. As mentioned hereinabove, the switch 27 can be embodied as a microswitch of known construction. What of course is essential is that all of the functional elements of the arrangement are constructed in such a way that they operate and function correctly and coact as described hereinabove.

What is claimed is:

1. A stereoscopic camera arrangement for taking stereographic photographs with a movably mounted single lens camera, comprising in combination,
   rail support means;
   a carriage reciprocally movably arranged on said rail support means so as to move laterally relative to an object to be photographed which is situated in front of said carriage;
   a camera having a film plane and a base pivotally mounted on said carriage about a pivot support the axis of which extends through the optical axis and the film plane of the camera;
   a pair of guide means normally movably mounted with respect to each other on said carriage, said pair of guide means being connected to each other by an endless cable which is tautly wound around at least three rollers rotatably mounted on said carriage, a first one of said pair of guide means being pivotally connected to said base;
   guide slot means adjustably mounted underneath said carriage, the second one of said pair of guide means being operatively connected to said guide slot means so that the movement of said second guide means is guided by said guide slot means.

2. The stereoscopic camera arrangement as set forth in claim 1, wherein said carriage has a slot which is located in a plane passing through the optical axis of said camera and said second guide means has a pin extending into said slot thereby forming a pin and slot connection therewith.

3. The stereoscopic camera arrangement as set forth in claim 2, wherein said first guide means has a pin and said guide slot means comprises a guide member having a guide slot, said pin extending into said guide slot and forms a pin and slot connection therewith so that when the carriage moves laterally along the rail support means said pair of guide means coact with said guide slot means and said base to pivot the camera relative to the carriage so that the optical axis of the camera remains in coincidence with the center of the object to be photographed during the lateral movement of the camera.

4. The stereoscopic camera arrangement as set forth in claim 3, wherein said pair of guide means are disposed underneath the carriage.

5. The stereoscopic camera arrangement as set forth in claim 4, including a hollow cylindrical member extending through said carriage and base and being coaxial with and forming said first pivot support, guide rail means adjustably mounted underneath said carriage and being substantially coextensive with the lateral movement thereof, a rod coaxially vertically movably mounted in said hollow cylindrical member and having one end coacting with said guide rail means, a lever pivotally mounted in said camera, the other end of said rod coacting with said lever.

6. The stereoscopic camera arrangement as set forth in claim 5, including a shutter mechanism and film transport means and wherein said lever is operatively connected to said film transport means and said shutter mechanism.

7. The stereoscopic camera arrangement as set forth in claim 6, including a pair of contact elements adjustably mounted in said camera in the path of movement of said lever, switch means mounted on said lever and coacting with said pair of contact elements.

8. The stereoscopic camera arrangement as set forth in claim 7, wherein the length of said rod is adjustable.

* * * * *